United States Patent
Breitweg

Patent Number: 5,538,096
Date of Patent: Jul. 23, 1996

[54] ROTARY SLIDE VALVE FOR AUXILIARY POWER STEERING SYSTEMS IN MOTOR VEHICLES

[75] Inventor: Werner Breitweg, Schwäbisch, Germany

[73] Assignee: ZF Friedrichshafen AG, Friedrichshafen, Germany

[21] Appl. No.: 313,126

[22] PCT Filed: Mar. 27, 1993

[86] PCT No.: PCT/EP93/00750

§ 371 Date: Sep. 30, 1994

§ 102(e) Date: Sep. 30, 1994

[87] PCT Pub. No.: WO93/19971

PCT Pub. Date: Oct. 14, 1993

[30] Foreign Application Priority Data

Apr. 1, 1992 [DE] Germany .................. 42 10 697.4

[51] Int. Cl.⁶ .................................................. B62D 5/083
[52] U.S. Cl. .................. 180/429; 180/441; 180/428; 91/375 A
[58] Field of Search .................................... 180/132, 146, 180/147, 148, 149, DIG. 7, DIG. 4; 91/375 A, 376 R; 137/625.21

[56] References Cited

U.S. PATENT DOCUMENTS

| | | | |
|---|---|---|---|
| 3,707,167 | 12/1972 | Colleti | 180/DIG. 7 X |
| 3,746,045 | 7/1973 | Bunker et al. | 137/625.24 |
| 3,807,456 | 4/1974 | Colleti | 180/DIG. 7 X |
| 4,063,490 | 12/1977 | Duffy | 180/DIG. 18 X |
| 4,335,749 | 6/1982 | Walter | 180/DIG. 7 X |
| 4,373,598 | 2/1983 | Elser | 180/143 |
| 4,378,030 | 3/1983 | Duffy | 180/DIG. 7 X |
| 4,465,101 | 8/1984 | Hasegawa | 137/625.68 |
| 4,516,471 | 5/1985 | Duffy | 180/DIG. 7 X |
| 4,623,839 | 11/1986 | Rayner | 180/148 X |
| 4,742,883 | 5/1988 | Duffy | 180/DIG. 18 X |
| 4,759,420 | 7/1988 | Schipper, Jr. et al. | 180/143 |
| 4,768,604 | 9/1988 | Schipper | 180/143 |
| 4,788,877 | 12/1988 | Robinson et al. | 180/148 X |
| 4,796,715 | 1/1989 | Futaba et al. | 180/132 X |
| 4,905,782 | 3/1990 | Rieger et al. | 180/149 X |
| 5,029,513 | 7/1991 | Duffy | 180/143 X |
| 5,069,301 | 12/1991 | Adams | 180/149 X |
| 5,189,941 | 3/1993 | Roethlisberger et al. | 91/375 A |
| 5,392,875 | 2/1995 | Duffy | 180/149 X |

FOREIGN PATENT DOCUMENTS 1114779 5/1968 United Kingdom .

*Primary Examiner*—Eric D. Culbreth
*Assistant Examiner*—F. Zeender
*Attorney, Agent, or Firm*—Larson & Taylor

[57] ABSTRACT

A rotary slide valve (1) for auxiliary power steering systems in motor vehicles contains in a valve borehole (5) of a valve housing (2) a rotary slide (4) that is connected with a steering spindle connection (23). In an axial borehole (6) of the rotary slide (4), a control sleeve (7) is guided so that it can be turned by a limited angle. Rotary slide (4) in its axial borehole (6) has longitudinal control grooves (20) that cooperate with longitudinal control grooves (21) on the outer generated surface of control sleeve (7). The inside-located control sleeve (7) is made by means of a non-cutting production process and can thus have relatively small dimensions. With the help of such a process, for example, by means of cold shaping, one can make both the longitudinal control grooves (21) and the control edges of control sleeve (7). The entire rotary slide valve (1) can be made in a very compact fashion as a result of the small dimensions of control sleeve (7).

7 Claims, 1 Drawing Sheet

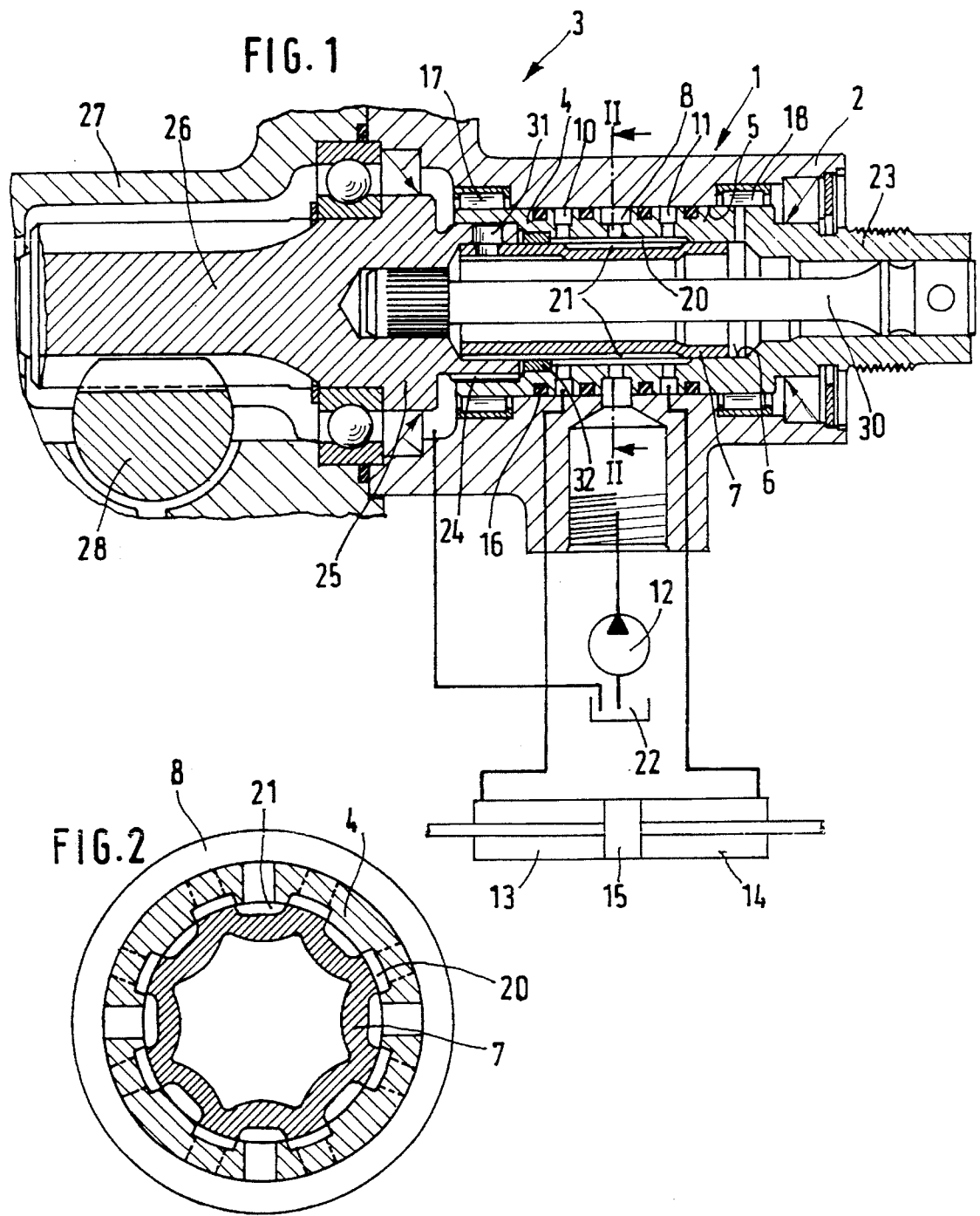

ROTARY SLIDE VALVE FOR AUXILIARY POWER STEERING SYSTEMS IN MOTOR VEHICLES

BACKGROUND OF THE INVENTION

1. Field of the Invention

This invention relates to a rotary slide valve for auxiliary power steering systems in motor vehicles. The rotary slide valve contains two valve elements that are arranged so that they are coaxially movable inside each other and so that they can be turned by a maximum of the turning distance of a dead-travel clutch with respect to each other. The first valve element is connected in a non-rotary manner with a valve inlet member and the second valve element is connected with a valve outlet member via a dead-travel clutch. The first valve element is connected with the valve outlet member via a torsion rod. Both valve elements have longitudinal control grooves that, at least partly, are limited in terms of their axial length and that cooperate directly with each other for the control of a pressure medium to and from two working chambers of a servomotor.

2. Description of the Prior Art

Such a rotary slide valve is known, for example, from U.S. Pat. No. 3,746,045. Like other known rotary slide valves, the known rotary slide valve contains a rotary slide that is guided in an axial borehole of a control sleeve. The rotary valve is connected with a valve outlet member via a torsion rod. Besides, the rotary slide is connected with the valve outlet member via a dead-travel clutch. Such a dead-travel clutch limits the relative turning of the two valve elements toward each other and creates a mechanical stop of the valve after the turning path of the dead-travel clutch has been used up. In case the auxiliary power support fails, it must be possible to transmit the entire mechanical steering force via this mechanical stop. These operating conditions create the dimensions of the dead-travel clutch and thus of the two valve elements and the entire rotary slide valve. The outside dimensions of the rotary slide valve, which are determined by the possible high mechanical stresses, are frequently too great for the limited installation space in a motor vehicle.

The task of the invention, therefore, is to reduce the dimensions of a known rotary slide valve and to improve the steering qualities of the auxiliary power steering.

SUMMARY OF THE INVENTION

This problem is solved by the rotary slide valve of the present invention. The solution consists in the fact that the rotary slide is not the internal but rather the external valve element so that the control sleeve is guided as a second valve element inside the rotary slide in an axial borehole. This arrangement is achieved, in particular, in that the control sleeve is made by means of a non-cutting production process. The control sleeve can be made with its control grooves and control edges ready for use by means of cold shaping. The control sleeve can be made of sheet metal with very thin walls with the help of the non-cutting production process. In spite of the thin wall, one gets a very stable control sleeve on account of the favorable material flow; the outside dimensions of that control sleeve are considerably smaller than comparable, hitherto known parts. The reduction of the valve diameters results in essentially less valve friction and thus an improved steering sensation.

The dead-travel clutch is formed by an internal gearing of the rotary slide and by an external gearing of the valve outlet member and thus rests on a relatively large diameter that ensures reliable catching even if the auxiliary power support should fail. Because the rotary slide is guided with its external circumferential surface directly in the valve housing and therefore must, on its outer circumferential surface, reveal the required ring grooves for the connections of the servopump, the tank, and the servomotor, it is possible to arrange sealing rings between these ring grooves. At least two of the customarily present four sealing rings are impacted by the working pressure and are therefore pressed against the borehole of the valve housing and thus have an advantageous attenuating effect.

If the rotary slide is positioned via two roller bearings in the valve housing, then the steering properties are further improved because the rotary slide valve works free of any lateral force. Besides, one can then considerably reduce the sealing gap between the rotary slide and the valve housing. In that way, the sealing rings can no longer be forced into the sealing gap and destroyed in case of high pressures and high temperatures.

The invention is not confined to the combinations of features given in the claims. The expert will find additional, meaningful possibilities of combining claims and individual claim features from the problem statement.

The invention will now be explained in greater detail below with the help of a practical example illustrated in the drawing.

BRIEF DESCRIPTION OF THE DRAWINGS

FIG. 1 is a longitudinal profile through the rotary slide valve according to the invention with a schematically illustrated, pertinent steering gear;

FIG. 2 is a lateral profile through the rotary slide valve along line II–III in FIG. 1 on an enlarged scale.

DETAILED DESCRIPTION OF THE PREFERRED EMBODIMENTS

A rotary slide valve 1 is contained in a valve housing 2 of an auxiliary power system 3.

Rotary slide valve 1 contains a first valve element in the form of a rotary slide 4 that is rotatably guided in a valve borehole 5 of the valve housing 2. Rotary slide 4 reveals an axial borehole 6 in which is rotatably guided a second valve element in the form of a control sleeve 7. Rotary slide 4 thus lies radially outside, while control sleeve 7 lies radially inside.

Along its outer generated surface, rotary slide 4 reveals ring grooves 8, 10, 11 to which is connected a servopump 12 or two working chambers 13 and 14 of a servomotor 15. Ring grooves 8, 10, 11 are sealed by sealing rings 16 with respect to valve borehole 5. Rotary slide 4 is positioned in valve housing 2 by means of two roller bearings 17 and 18. In its axial borehole 6, rotary slide 4 has longitudinal control grooves 20 that are limited in terms of their axial length and that cooperate with longitudinal control grooves 21 that are arranged along the outer generated surface of control sleeve 7. A part of the longitudinal control sleeves 21 is closed off toward both ends of control sleeve 7. Some of the longitudinal control sleeves 21 are open toward one end of control sleeve 7 and are connected with a pressure medium tank 22 from which servopump 12 suctions pressure medium.

Rotary slide 4 is connected in a non-rotating manner with a valve inlet member that is made as a steering spindle connection 23. Steering spindle connection 23, for example, is connected with a steering spindle—not illustrated—via a likewise not illustrated universal joint. Rotary slide 4 is furthermore connected via a dead-travel clutch 24 with a valve outlet member 25. Dead-travel clutch 24, for example, consists of an internal gearing on rotary slide 4 and an outer gearing on valve outlet member 25. Valve outlet member 25 at the same time represents an inlet member of the mechanical part of auxiliary power steering unit 3 and, for example, is connected with a pinion 26. Pinion 26 is rotatably positioned in a steering housing 27 and cooperates with a steering rack 28 that is guided in steering housing 27 in an axially movable manner.

Rotary slide 4 is furthermore connected with valve outlet member 25 via a torsion rod 30. Valve outlet member 25, in turn, is connected via a pin 31 in a non-rotating manner with control sleeve 7 that at one of its ends is received in an axial borehole of valve outlet member 25.

A limited turning between the rotary slide 4 and control sleeve 7 is possible by virtue of these differing connections. As a result of this turning between the two valve elements, the pressure medium conveyed by servopump 12, is supplied to the particular working chamber 13 or 14 of servomotor 15 and is conducted back to the pressure medium tank 22 from the corresponding other working chamber 14 or 13.

According to the invention, control sleeve 7 is made by way of a non-cutting production process. On account of its simple form and arrangement, control sleeve 7, including the longitudinal control grooves 21 and the control edges arranged on them, can be made at low cost by cold shaping in a ready-made manner.

The longitudinal control grooves 20 of rotary slide 4, which lie on the inside, can be made in a cutting process, for example, by pushing. The open ends of longitudinal control grooves 20 are then closed off by a terminal ring 32 as shown in FIG. 1. Longitudinal control grooves 20 of rotary slide 4, however, can also be made by cold shaping, for example, by cold extrusion or kneading. In these last-mentioned processes, the terminal of the longitudinal control grooves 20 is automatically moulded. This is also possible in connection with various known cutting processes.

If rotary slide 4 is made by cold shaping, then the internal gearing of the dead-travel clutch 24 can be made simultaneously.

References

1 Rotary slide valve
2 Valve housing
3 Auxiliary power steering
4 Rotary slide
5 Valve borehole
6 Axial borehole
7 Control sleeve
8 Ring groove
9 --
10 Ring groove
11 Ring groove
12 Servopump
13 Working chamber
14 Working chamber
15 Servomotor
16 Sealing ring
17 Roller bearing
18 Roller bearing
19 --
20 Longitudinal control groove
21 Longitudinal control groove
22 Pressure medium tank
23 Steering spindle connection
24 Dead-travel clutch
25 Valve outlet member
26 Pinion
27 Steering housing
28 Steering rack
29 --
30 Torsion rod
31 Pin
32 Terminal ring

I claim:

1. Rotary slide valve for auxiliary power steering systems in motor vehicles which comprises a first, radially outer slide valve element (4) that is connected in a non-rotary fashion with a valve inlet member (23) and with a second, radially inner slide valve element (7) that is connected in non-rotary fashion with a valve outlet member (25), wherein the first valve element (4) is connected with the valve outlet member (25) via a torsion rod (30) and via a dead-travel clutch (24), said dead-travel clutch (24) having a turning path, wherein the first and second valve elements (4, 7) are arranged in a valve housing (2) so that the first and second valve elements are coaxially movable relative to one other and such that the first and second valve elements can be turned by a maximum distance of the distance of the turning path of the dead-travel clutch (24) with relation to each other, wherein the first, outer valve element (4) includes inner longitudinal control grooves (20) and the second, inner valve element (7) includes outer longitudinal control grooves (21), said inner and outer longitudinal control grooves (20, 21) including control edges and being at least partially limited in their axial length, and wherein said inner longitudinal control grooves (20) cooperate with said outer longitudinal control grooves (21) to control a flow of pressure medium to and from two working chambers (13, 14) of a servomotor (15), wherein the first valve element (4) further includes an axial borehole (6) in which is guided the second valve element (7), and wherein the second valve element (7) consists of a part that is made by a non-cutting process.

2. Rotary slide valve according to claim 1, wherein the second valve element (7) with its longitudinal control grooves (21) and its control edges is made by cold shaping.

3. Rotary slide valve according to claim 2, wherein the second valve element (7) includes a first end and a second end and at one of the ends the second valve element (7) is received in an axial borehole of a valve outlet member (25) and is retained in position in the axial borehole by a pin (31).

4. Rotary slide valve according to claim 1, above wherein the dead-travel clutch (24) is formed by an internal gearing of first valve elements (4) and an external gearing of valve outlet member (25).

5. Rotary slide valve according to claim 1, above, wherein first valve elements (4) along its outer generated surface has ring grooves (8, 10, 11) that are sealed by sealing rings (16).

6. Rotary slide valve according to claim 1, above, wherein the inner longitudinal control grooves (20) of the first valve elements (4) and the internal gearing of the dead-travel clutch (24) are made by cold shaping.

7. Rotary slide valve according to claim 5, above, characterized in that the first valve element (4) is positioned in the valve housing (2) by means of two roller bearings (17, 18).

\* \* \* \* \*